Patented Oct. 17, 1939

2,176,219

UNITED STATES PATENT OFFICE 2,176,219

DISPERSION AND METHOD FOR PRODUCING THE SAME

Paul E. Marling and Charles A. Thomas, Dayton, Ohio, assignors, by mesne assignments, to Monsanto Chemical Company, a corporation of Delaware No Drawing. Application March 3, 1936, Serial No. 66,966

6 Claims. (Cl. 260—41)

This invention relates to the treatment of finely divided solid particles such as pigments, carbon black, lamp black, graphite and the like, whereby they may be dispersed or rendered readily dispersible in a vehicle as, for example, paint and varnish solvents, mineral or vegetable oils, paints and varnish compositions, etc. The invention likewise contemplates a treatment whereby a state of intimate dispersion once established even in paste form is maintained and separation or segregation is retarded or inhibited. By means of the present invention, dispersion is not only facilitated and maintained, but upon drying or evaporation of the solvent, the medium by which these results are attained functions as a valuable binder and light stable, inert film forming constituent.

In making pigment pastes, that is, compositions containing solid pigments together with sufficient wetting liquid to produce a material exhibiting plastic properties, linseed oil is used as the wetting liquid or vehicle, because of its wetting properties. Linseed oil is preferred to most other drying or non-drying oils, inasmuch as the wetting properties of the latter are, in general, inferior. Solutions or dispersions of natural or synthetic resins in liquids are poorer wetting vehicles for pigments than linseed oil. Furthermore, many resin solutions cause thickening of so-called chemically active pigments, such as zinc oxide, and cannot, therefore, be used.

For dispersing pigments in vehicles to make pigment pastes, prolonged grinding operations are frequently necessary to reduce the agglomerates or clumps of pigments to a degree of fineness sufficient for their subsequent use in paints, enamels, lacquers and similar compositions. Linseed oil pastes usually have good flowing properties, whereas pastes produced by the use of solutions of resins as vehicles do not exhibit good flowing properties. Moreover, if the pigment is not wetted sufficiently by the vehicle, it settles rapidly from such resulting compositions, especially if the vehicle is thin, that is, has a low viscosity and a specific gravity lower than the apparent specific gravity of the pigment.

Films can be prepared from pigment pastes by spreading the paste on a smooth surface. When pigment pastes in which linseed oil is the vehicle are thus treated the film is smooth and adherent, but pastes made from equivalent proportions of resin solution vehicles deposit films exhibiting deficiencies in these properties, often they are uneven, lumpy, and can easily be rubbed from surfaces.

We have discovered that pigments including graphite and the like, can be dispersed advantageously and uniformly in solutions of hydrocarbon resins, which are formed by the polymerization in the presence of a Friedel-Crafts catalyst of olefines, diolefines and aromatics, which are described more fully hereafter. These solutions have good wetting properties for pigments. Because of these wetting properties these solutions of hydrocarbon resins produce a free-flowing paste with a smaller amount of vehicle as compared to other resin solutions as, for example, coumarone indene. Such dispersions flow readily, even when the pigment content is high, and films resulting therefrom are smooth, uniform and adherent to surfaces such as those of metal and wood.

The pigment pastes made with a resin solution vehicle are comparable so far as dispersion is concerned to linseed oil pastes and possess many advantages such as light stability and neutrality over these pastes.

For this purpose a solution of equal parts by weight of the hydrocarbon resin and petroleum naphtha is used, to obtain a paste of approximately the same general physical characteristics as one made with linseed oil. Pigments are easily and uniformly dispersed in solutions of hydrocarbon resins with but little grinding as compared to other resins or linseed oil, and no thickening occurs with basic pigments, such as zinc oxide. The wetting properties of such resin solutions are judged by the paste becoming free flowing and good levelling. Solutions of the hydrocarbon resins contemplated by our invention exhibit these properties to a surprising degree.

The petroleum hydrocarbon resins which are particularly advantageous in the preparation of the compositions of this invention are those described in United States Patents 1,836,629, 1,947,626, 1,982,707, 1,982,708, 2,039,363, 2,039,364, 2,039,365, 2,039,366, 2,039,367, and 2,084,012.

In general, the resins are obtained by the polymerization under the influence of a Friedel-Crafts catalyst of a hydrocarbon mixture consisting of a diolefine and an olefine, or an aromatic hydrocarbon or both. A convenient source of hydrocarbon mixture that is especially suitable, is that obtained by the severe cracking of the various petroleum hydrocarbons.

Most pigments have been found applicable for use in the invention. Thus, by way of example, the following classes of pigments can be employed satisfactorily: oxides, chromates, sulphates and sulphides. Representative pigments are zinc oxide, carbon black, lead chromate, lithopone, basic lead carbonate, titanium oxide, titanium oxide precipitated with barium sulphate. Thus, according to our invention, pigments such as basic lead carbonate, lead sulphate, zinc oxide, lithopone, titanium oxide, iron oxide, barium sulphate, Prussian blue, ultramarine blue, lead chromate, carbon black, bone black, calcium carbonate, asbestine, silica, etc., are employed in vehicle pastes with said hydrocarbon resin solutions for paints, enamels, and lacquers and similar compositions. In like manner, zinc oxide, carbon black, calcium carbonate, asbestine, lithopone, titanium oxide, etc., are used with vehicles of hydrocarbon resin solutions in the manufacture of linoleum, rubber products, adhesive cements, wood preservatives, and construction asphalts or cements, paper, pulp board, and for weighting fabrics. Similarly the invention contemplates carbon blacks and wax pastes which are used with the hydrocarbon resin vehicles in the making of carbon paper. Printing inks of desirable characteristics can be made by the use of pigments and vehicles consisting of hydrocarbon resins in appropriate solvents whereby effective dispersion can be attained without the usual dispersing oils and the resin serves as a binder for the pigment. Solids, such as graphite, sulphur, waxes and talc are employed in pastes with hydrocarbon resin in the production of lubricating oils or greases, molding powders and emulsions. Coatings containing zinc oxide and other pigments not attacked by sulphur compounds with hydrocarbon resin vehicles, are particularly desirable for the interior of cans in which vegetables are encased. This invention offers particular advantages in the preparation of such coating materials. Thus, it is evident that the invention by suitable modifications is applicable for many purposes and in many diverse industries.

For use as a vehicle in pigment pastes the hydrocarbon resins can be used in solutions of a variety of solvents, for example, aliphatic hydrocarbons such as petroleum naphtha, aromatic hydrocarbons such as benzene and toluene, esters such as amyl acetate, and in oils such as linseed oil, if desired. Because of the great pigment wetting power of such resin solutions only small proportions are necessary. For example, with zinc oxide, about 30 parts by weight of a solution of equal parts by weight of resin and naphtha, are required to produce a paste of satisfactory properties with 70 parts by weight of pigment. This proportion, however, varies with different pigments and quantity of resin solvent, hence preliminary small-scale tests should be made by grinding a definite quantity of the pigment on a smooth surface with a spatula and adding dropwise the resin solution vehicle until a paste of satisfactory consistency is produced. From the weights of pigment and vehicle, one can compute the proportions required for larger batches. The following comparative results indicate the efficacy of the resin when used according to our invention.

The percentages are by weight of a solution of equal parts by weight of petroleum naphtha and the resin produced by treatment of a fraction of a severely cracked kerosene distillate with aluminum chloride which, when incorporated with the pigments indicated, wetted them and yielded heavy pastes.

|  | Per cent |
|---|---|
| Zinc oxide | 30 |
| Lithopone | 25 |
| Titanium dioxide | 20 |
| White lead (basic lead carbonate) | 15 |
| Iron oxide | 20 |

A comparison of the relative differences in the wetting of zinc oxide pigment may be obtained from the following tabulation. The resins were all dissolved in equal parts by weight of the solvents indicated; the percentages represent the percentage by weight of resin solution in the resulting heavy paste:

|  | Per cent |
|---|---|
| Hydrocarbon resin (Friedel-Crafts polymer)—amyl acetate | 30 |
| Hydrocarbon resin (Friedel-Crafts polymer)—toluene | 30 |
| Hydrocarbon resin (Friedel-Crafts polymer)—petroleum naphtha | 30 |
| Rosin ester—petroleum naphtha | 40 |
| Coumarone—indene—petroleum naphtha and toluene | 45 |
| Oil—soluble phenolic resin—petroleum naphtha and toluene | 45 |
| Fused Congo resin—petroleum naphtha and toluene | 45 |
| Raw linseed oil | 30 |
| Dammar—toluene | 35 |
| Hydrocarbon resin (fuller's earth polymer)—petroleum naphtha | 38 |
| Raw tung oil | 33 |
| Raw castor oil | 35 |
| Paraffin oil | 40 |
| Lubricating oil | 40 |

The values above indicate the wetting capacity of the resin solutions or other vehicles. Pastes which contained 40 parts by weight of the solutions above and sixty parts by weight of zinc oxide were prepared in order to obtain comparable values for flowing properties, showed that only with the solutions of the Friedel-Crafts hydrocarbon polymers do the resulting pastes flow in threads from a spatula. The other pigment pastes were short and flowed off in lumps or drops. Such flowing characteristics are reflected in tests with other pigments which follow herein.

Basic lead carbonate (white lead) requires for wetting the following amounts of vehicle expressed in percent by weight. The resin solutions were made of equal parts of resin and petroleum naphtha solvent:

|  | Per cent |
|---|---|
| Hydrocarbon resin (Friedel-Crafts polymer)—solution | 15 |
| Rosin ester—solution | 20 |
| Raw linseed oil | 15 |

In order to measure the dispersion and settling of pigments in resin solutions and linseed oil 4 grams of equivalent pigment pastes were shaken in long test tubes with 20 grams of petroleum naphtha. Settling was observed at periods. With pigment pastes made from zinc oxide and those made from titanium dioxide, both linseed oil and a hydrocarbon resin solution in naphtha showed no settling after two hours, whereas the same pigments made into a paste with an equivalent rosin ester solution settled in one hour.

After 24 hours titanium dioxide in raw linseed oil settled. After 48 hours most of the zinc oxide in raw linseed oil had settled, whereas after 48 hours both the zinc oxide and titanium oxide in petroleum hydrocarbon resin solution showed no settling.

As an example of the method of producing a paint or enamel from a pigment paste made with a hydrocarbon resin solution vehicle, the following is typical: Equal parts by weight of a petroleum hydrocarbon resin made by treatment of a cracked petroleum distillate with aluminum chloride and linseed oil are heated to about 550° F. and processed in the usual manner to a desired body. Thinners, such as petroleum naphtha and a siccative such as lead and manganese resinate are then added. To this resulting varnish is then added with stirring the paste containing pigment dispersed in a hydrocarbon resin vehicle in a quantity sufficient to give the desired color and covering power.

In the manufacture of printing inks which consist principally of a pigment and binding agent dispersed in a volatile solvent, the invention is especially applicable. The pigment pastes made according to the method of the invention possess flowing properties especially desirable in such products.

To illustrate: Germantown lamp black or carbon black is made into pastes with raw linseed oil, with a naphtha solution of a petroleum resin solution and with a naphtha solution of rosin ester. Each paste contained 72% vehicle; the following differences were observed. The petroleum resin paste was slightly thin with good flowing properties, the rosin ester paste was slightly heavy and very short with no flowing properties, the raw linseed oil paste was slightly thin and short with no flowing properties. Settling tests were made by mixing 4 g. of each vehicle paste with 20 g. of high boiling naphtha (mineral spirits) in test tubes. The pigment in the rosin ester paste settled considerably in two hours and very much in 48 hours, the petroleum resin and raw linseed oil tests show no pigment settling in 96 hours.

In the treatment of lubricating oils with graphite, the petroleum resin offers a medium of preventing the graphite from settling in the oil. The following example shows the comparison of two oils, one containing graphite without hydrocarbon resin solution and the second one containing graphite with hydrocarbon resin solution. Four grams of the graphite are dispersed in 3 to 5 grams of solution of hydrocarbon resin in naphtha and are then mixed with 20 grams of lubricating oil (S. A. E. 30). The mixture showed no settling after 96 hours. The same amount of graphite without hydrocarbon resin naphtha solution showed considerable settling in 96 hours.

In the manufacture of putty, cements, linoleum and floor coverings, or other uses set forth above, the hydrocarbon resin may be milled with the pigment for incorporation. The dry powdered hydrocarbon resin is mixed with the pigment in a pebble or ball-mill for the necessary time with or without the addition of other liquids. The hydrocarbon resin may be in solution form if desired. Linseed oil or other liquid may then be added for the necessary formulation and given further mixing in the pebble or ball-mill. An example is given—one hundred grams of zinc oxide are mixed with 100 grams of dry powdered hydrocarbon resin and run in a pebble or ball mill for one hour, the zinc oxide resin mixture will be in dry powdered form. Then 40 grams of raw linseed oil are added to the batch and further mixed for one hour. The necessary siccatives, lead and manganese were added with the raw linseed oil. The finished paste was fairly thin. It had fine pigment dispersion, smooth flowing and quick drying properties.

It is to be understood that the present invention may take many varied forms, such, for example, an intimate dry mixture of pigment and hydrocarbon resins such as can be obtained by subjecting two materials to the action of a ball mill, alternatively one may dissolve the resin in a solvent after which the pigment is incorporated therein and dispersed to the desired degree, whereby a long or well dispersed paste is produced which can be used in the manner well known to those skilled in the several arts, wherein pigments are commonly utilized. If desired, this paste may be dried by expelling the solvent, thereby producing a solid in which the pigment is intimately dispersed in the resin which acts as a binder, but which can be re-dissolved readily to produce the intimate dispersion. The drying operation is performed advantageously on a drum drier, in which case a flaked product is conveniently obtained. Such flaked product is for many purposes a more convenient form in which to handle pigments than the paste referred to above. The fact that the hydrocarbon resin is substantially neutral and is not affected by light is an important advantage over such common well known resins as coumarone indene, alkyd resins, etc., in addition to the fact that the resin possesses the property of dispersing pigments to a surprising degree.

It is to be understood that the paste can be of any desired consistency and that the liquid vehicle or solvent for the resin may be varied widely. It is likewise to be observed that the present invention enables one to omit linseed oil in many fields of application where it has been considered indispensable heretofore including, by way of example, printing inks.

While we have described our invention as it applies in various arts, and indicated the advantages obtained therewith, it is to be understood that the examples are merely illustrative of the application of the principles of the invention and that these embodiments may take other forms without departing from the spirit of the invention.

What we claim is:

1. In a method for dispersing pigments in liquid and plastic solid media, the improvement characterized in that the pigment is first intimately mixed with a petroleum-hydrocarbon-soluble unsaturated resinous polymer obtained by polymerizing in the presence of a Friedel-Crafts catalyst a liquid hydrocarbon mixture rich in diolefines resulting from the cracking of petroleum hydrocarbons.

2. The method as defined in claim 1 and further characterized in that the catalyst consists of anhydrous aluminum chloride.

3. A dispersed pigment in concentrated paste form consisting of a pigment intimately mixed with a solution in an organic solvent of the unsaturated petroleum-naphtha-soluble hydrocarbon resin obtained by polymerizing a cracked petroleum distillate fraction rich in diolefines under the influence of a Friedel-Crafts catalyst.

4. An article of manufacture, a pigment in readily dispersible form, characterized in that it is intimately mixed with an unsaturated petroleum-naphtha-soluble hydrocarbon resin obtained by polymerizing a cracked petroleum distillate fraction rich in diolefines.

5. A method for producing wettable solids in a form in which they are readily dispersible in liquid and plastic solid media characterized in that the wettable solid is intimately mixed with a solution in an inorganic solvent of an unsaturated petroleum-hydrocarbon-soluble resinous polymer obtained by polymerizing in the presence of a Friedel-Crafts catalyst a liquid hydrocarbon mixture rich in diolefins resulting from the cracking of petroleum hydrocarbons.

6. A composition of matter comprising a wettable solid in readily dispersible form intimately mixed with a solution in an organic solvent of an unsaturated petroleum-naphtha-soluble hydrocarbon resin obtained by polymerizing a cracked petroleum distillate rich in diolefins under the influence of a metallic halide catalyst of the Friedel-Crafts type.

PAUL E. MARLING.
CHARLES A. THOMAS.